United States Patent
Jogdand et al.

(10) Patent No.: US 11,420,286 B2
(45) Date of Patent: Aug. 23, 2022

(54) CONSUMABLE DESIGNS FOR A PLASMA ARC TORCH

(71) Applicant: Hypertherm, Inc., Hanover, NH (US)

(72) Inventors: Harshawardhan Jogdand, Lebanon, NH (US); Girish Kamath, Lebanon, NH (US); Oliver Murphy, Hartland, VT (US); Raifer Allen, Perkinsville, VT (US)

(73) Assignee: Hypertherm, Inc., Hanover, NH (US)

( * ) Notice: Subject to any disclaimer, the term of this patent is extended or adjusted under 35 U.S.C. 154(b) by 112 days.

(21) Appl. No.: 16/952,952

(22) Filed: Nov. 19, 2020

(65) Prior Publication Data

US 2021/0153334 A1 May 20, 2021

Related U.S. Application Data

(60) Provisional application No. 62/940,039, filed on Nov. 25, 2019, provisional application No. 62/937,537, filed on Nov. 19, 2019.

(51) Int. Cl.
*H05H 1/28* (2006.01)
*B23K 10/00* (2006.01)
*H05H 1/34* (2006.01)

(52) U.S. Cl.
CPC ............... *B23K 10/00* (2013.01); *H05H 1/28* (2013.01); *H05H 1/3405* (2013.01); *H05H 1/3421* (2021.05)

(58) Field of Classification Search
CPC ...... H01H 1/28; H01H 1/3421; H01H 1/3405; B23K 10/00

USPC .................................................. 313/30
See application file for complete search history.

(56) References Cited

U.S. PATENT DOCUMENTS

| | | |
|---|---|---|
| 5,310,988 A | 5/1994 | Couch, Jr. et al. |
| 5,451,739 A | 9/1995 | Nemchinsky et al. |
| 5,951,888 A | 9/1999 | Oakley |
| 5,994,663 A | 11/1999 | Lu |
| 6,583,378 B1 | 6/2003 | Yamaguchi et al. |
| 6,703,581 B2 | 3/2004 | Jones et al. |
| 6,852,944 B2 | 2/2005 | MacKenzie et al. |

(Continued)

FOREIGN PATENT DOCUMENTS

| | | |
|---|---|---|
| EP | 0817547 A1 | 1/1998 |
| EP | 0941018 A2 | 9/1999 |

(Continued)

*Primary Examiner* — Christopher M Raabe
(74) *Attorney, Agent, or Firm* — Proskauer Rose LLP

(57) ABSTRACT

A liquid cooled electrode for a contact start plasma arc cutting torch is provided. The electrode includes an elongated body defining a longitudinal axis. The elongated body includes a proximal end shaped to matingly engage a torch body of the plasma arc cutting torch and a distal end located substantially opposite of the proximal end along the longitudinal axis. The electrode also includes one or more contact surfaces disposed on an external surface of the distal end of the electrode body between the proximal and distal ends. The one or more contact surfaces are shaped to physically contact a nozzle disposed within the plasma arc cutting torch during a portion of a pilot arc initiation process. The physical contact is configured to support transmission of a pilot arc current between the electrode and the nozzle with a density of at least about 3000 amps per square inch.

27 Claims, 10 Drawing Sheets

(56) References Cited

U.S. PATENT DOCUMENTS

| | | |
|---|---|---|
| D517,576 S | 3/2006 | Conway et al. |
| 7,754,996 B2 | 7/2010 | Brandt et al. |
| 8,089,025 B2 | 1/2012 | Sanders |
| 8,633,417 B2 | 1/2014 | Ashtekar et al. |
| 10,561,010 B2 | 2/2020 | Roberts et al. |
| 2004/0011771 A1* | 1/2004 | Horner-Richardson ............... H05H 1/34 219/121.48 |
| 2007/0045241 A1 | 3/2007 | Schneider et al. |
| 2014/0021175 A1 | 1/2014 | Chen et al. |
| 2021/0146468 A1* | 5/2021 | Jogdand ............ B23K 10/00 |

FOREIGN PATENT DOCUMENTS

| | | |
|---|---|---|
| EP | 2084947 B1 | 8/2016 |
| WO | 2007129194 A2 | 11/2007 |

\* cited by examiner

CONSUMABLE DESIGNS FOR A PLASMA ARC TORCH

CROSS REFERENCE TO RELATED APPLICATION

This application claims the benefit of and priority to U.S. Provisional Patent Application Nos. 62/937,537, filed on Nov. 19, 2019, and 62/940,039, filed on Nov. 25, 2019, the entire content of both of which are owned by the assignee of the instant application and are incorporated herein by reference in their entireties.

TECHNICAL FIELD

The present invention relates generally to consumable designs for contact-start, liquid-cooled plasma arc cutting torches, and, more particularly, to consumable designs that reduce damage to process critical geometric features during contact start ignition of these plasma arc torches.

BACKGROUND

Plasma arc torches are widely used for high temperature processing (e.g., cutting, welding, and marking) of metallic materials. A plasma arc torch generally includes a torch body, an electrode mounted within the body, an emissive insert disposed within a bore of the electrode, a nozzle with a central exit orifice, a shield, electrical connections, passages for cooling and arc control fluids, a swirl ring to control the fluid flow patterns, and a power supply. The plasma arc torch can produce a plasma arc, which is a constricted, ionized jet of plasma gas with high temperature and high momentum. Gases used in the torch can be non-reactive (e.g., argon or nitrogen) or reactive (e.g., oxygen or air).

A plasma arc torch can generate a plasma arc using a contact start approach. This involves first operating the torch in a pilot arc mode, which includes establishing physical contact and electrical communication between two electrically conductive torch consumables, such as the electrode and the nozzle, by using a biasing force from, for example, a spring. A current path and a small pilot arc current flow are established between the electrode and the nozzle while they are biased together. A plasma gas is introduced into a plasma chamber/plenum region between the nozzle and the electrode, such that gas pressure builds up in the plasma chamber to break the physical contact between the electrode and the nozzle and separate the two components. The separation causes an electrical arc to be created in the gap between the electrode and the nozzle in the plasma chamber. The electrical arc ionizes the flowing plasma gas in the plasma chamber to produce a plasma arc (i.e., a pilot arc). The plasma gas can be passed through a swirl ring to impart a tangential motion to the gas as it passes through the torch, thereby improving torch performance. Next, in a transferred arc mode, the torch is moved near a grounded workpiece and the plasma arc makes contact with the workpiece. Upon contact, the current transfers from the nozzle to the workpiece and returns from the workpiece back to the power supply. During transferred arc mode, the current flow can be increased to effectively process (e.g., gouge, pierce or cut) the workpiece.

Traditionally, consumable components in a contact start plasma arc cutting torch, such as the nozzle and electrode, have contact/mating features proximate to the nozzle bore through which the plasma arc is ejected from the torch (e.g., to limit the distance the arc needs to travel within the plenum before reaching the workpiece). These contact/mating features—are generally symmetrical about the longitudinal axis of the torch and have very narrow contact points with one another to drive a pilot arc current of high current density therethrough. As the contact between these consumable components (e.g., the nozzle and electrode) breaks during arc initiation, the resistive heating (e.g., Joule heating) caused by the pilot arc current and the separation can result in consumable damage, including localized deformation, and melting and evaporation of the contact/mating features. In addition, materials expelled during this separation process can deposit in the plenum chamber of the plasma arc torch and damage adjacent process critical geometric features of the consumables (e.g., electrode tip and liner/nozzle bore(s)). Further, because such deposition and/or damage frequently occurs close to the liner/nozzle bore(s), which can favor certain region over time and can build up asymmetrically, this can create disturbances in gas flow and to plasma arc generation in that region.

FIGS. 1a and 1b show exemplary deposition on and damage to a prior art nozzle 100 and a prior art electrode 102, respectively, of a prior art contact start plasma arc cutting system following about 3600 pilot arc initiations (i.e., starts). The surfaces of the electrode 102 and the nozzle 100 show significant compromised/degraded conditions. For example, with respect to FIG. 1a, the deep pitting in the plenum 104 and the liner bore 106 of the nozzle 100 is evident and represents a common occurrence with such consumables. Further, with respect to FIG. 1b, the copper around the hafnium insert 108 of the electrode 102 is significantly eroded. In addition to consumable surface damage on process critical features, contact starting the nozzle 100 and the electrode 102 can also lead to significant deposition as well as disturbances of critical fluid flow and plasma arc generation, thus reducing consumable life as well as impacting cut quality over life.

Further, during pilot arc initiation when the electrode is in physical contact with the nozzle, the narrow, smooth and substantially continuous/even contact formed between the two components can seal and/or inhibit gas flow through the plenum and out the liner/nozzle bore(s) before separation of the electrode and the nozzle occurs, which can cause additional damage to consumable components as a result of this lack of established pre-flow prior to arc initiation. FIGS. 2a and 2b show an end view and a perspective view, respectively, of another prior art electrode 200. FIG. 3 shows a cross-sectional view of a portion of a prior art contact start plasma arc cutting torch 300 that includes the electrode 200 of FIGS. 2a and 2b. The torch 300 also includes a nozzle with a nozzle liner 302 in physical contact with the electrode 200. As shown in FIG. 3, the contact area 304 between the electrode 200 and the nozzle liner 302 extends over almost an entire outer circumference of the electrode 200 and almost an entire inner circumference of the nozzle liner 302, thereby forming a substantially complete seal between the two components. In addition, the contact area 304 is axially narrow. In some embodiments, the contact area 304 is sufficiently small that it forms only a continuous circumferential line of contact between the nozzle liner 302 and the electrode 200, as illustrated in FIG. 2b. Specifically, FIG. 2b shows the circumferential contact line 304 (shown dashed for clarity) around the tip of the electrode 200, at which location contact occurs between the electrode 200 and the nozzle liner 302 when they are biased together inside of the torch 300.

This narrow line of contact 304 is potentially damaging to plasma arc generation and can exacerbate the deposition and structural degradation issues described above. For example, this line of contact 304 and the subsequent sealing of (i.e. lack of established) gas flow through the plenum 306 is detrimental to consumable life and plasma arc operation, as a plasma arc requires a strong gas flow about it in the plenum 306 to direct the arc out of the liner bore 307 and the nozzle bore 308, and this gas flow cannot be instantaneously developed. As such, once separation between the nozzle liner 302 and electrode 200 occurs, the plasma arc formed within the plenum 306 can only progress out of the bores 307, 308 sub-optimally while the gas pressure and flow rate are still being established. This delay results in further consumable degradation, cut quality limitations, and overall inefficient workpiece processing.

Therefore, there is a need for consumable designs that improve the contact surface and location of contact between certain consumables (e.g., between an electrode and a nozzle) in a plasma arc cutting torch to reduce damage to process critical geometric features and components during contact start ignition of the plasma arc torch.

SUMMARY

The present invention provides consumable designs that control and substantially improve contact surface parameters and locations between two consumables (e.g., between an electrode and a nozzle) in a contact-start, liquid-cooled plasma arc torch such that damage to process critical geometric features during contact start ignition is reduced. Various embodiments of the present invention permit a plasma gas flow and pressure to be established in the plenum chamber of the torch when the consumables are still in physical contact, including permitting the plasma gas flow to be established (e.g., substantially established) in advance of consumable separation (i.e., before the physical contact breaks between the consumables). This is crucial to rapid plasma arc transfer to a workpiece, which minimizes heat energy influx into the consumables and reduces thermal damage, thereby extending consumable life. In addition, various embodiments of the present invention move the contact area between the consumables away from process critical features (e.g., electrode tip and nozzle/liner bore(s)) to minimize damage to these features during contact starting, which also extends consumable life and cut quality over life.

The invention, in one aspect, features a liquid cooled electrode for a contact start plasma arc cutting torch. The liquid cooled electrode includes an elongated body defining a longitudinal axis. The elongated body includes a proximal end shaped to matingly engage a torch body of the contact start plasma arc cutting torch and a distal end located substantially opposite of the proximal end along the longitudinal axis. The distal end includes an emissive insert. The electrode also includes one or more contact surfaces disposed on an external surface of the distal end of the electrode body between the proximal and distal ends. The one or more contact surfaces are shaped to physically contact a nozzle disposed within the contact start plasma arc cutting torch during a portion of a pilot arc initiation process of the torch. The physical contact is configured to support transmission of a pilot arc current between the electrode and the nozzle with a density of at least about 3000 amps per square inch.

In some embodiments, each contact surface has a surface area greater than about 0.002 square inches. In some embodiments, a combined area of the one or more contact surfaces is greater than about 0.015 square inches. In some embodiments, each contact surface is configured to physically contact the nozzle over at least one of an axial distance of at least 0.02 inches. In some embodiments, each contact surface is angled to be substantially parallel to a complementary interior surface of the nozzle.

In some embodiments, the contact surfaces are disposed radially around a circumference of the external surface of the electrode. The one or more contact surfaces can be radially discontinuous and form discontinuous circumferential contacts between the electrode and the nozzle during the portion of the pilot arc initiation process. In addition, the electrode can further comprise one or more channels disposed on the exterior surface of the electrode. The one or more channels can be interspersed radially between the one or more contact surfaces to permit a pre-flow of plenum gas between the nozzle and the electrode during the portion of the pilot arc initiation process. In some embodiments, each channel is positioned radially between a pair of the contact surfaces. In some embodiments, each channel is substantially arcuate relative to the one or more contact surfaces. In some embodiments, each channel has a cross-sectional width of greater than about 0.05 inches. In some embodiments, the one or more contact surfaces and the one or more channels are uniformly spaced about the circumference of the external surface of the electrode to facilitate substantially symmetrical plasma arc initiation and transition through a bore of the nozzle. Alternatively, the one or more contact surfaces and the one or more channels are asymmetrically distributed around the circumference of the external surface of the electrode to influence a direction of plasma arc initiation and transition through a bore of the nozzle.

In some embodiments, the one or more contact surfaces are radially contiguous to each other around the distal end to form a continuous circumferential contact between the electrode and the nozzle during the portion of the pilot arc initiation process.

In some embodiments, the distal end of the electrode body comprises a frustoconical section that tapers toward the emissive insert. In some embodiments, the one or more contact surfaces are disposed on a plurality of pads raised above a surface of the frustoconical section, the plurality of pads shaped to seat against an internal surface of the nozzle during the portion of the pilot arc initiation process. In some embodiments, the one or more contact surfaces are located at least 0.07 inches distally aft the emissive insert in the frustoconical section.

In some embodiments, the current transmission density of the pilot arc current between the electrode and the nozzle is about 5000 amps per square inch. In some embodiments, the electrode body is substantially hollow for conducting a liquid coolant therein.

In another aspect, the present invention features a liquid cooled nozzle for a contact start plasma arc cutting torch. The liquid cooled nozzle comprises a body defining a longitudinal axis. The body includes a proximal end shaped to matingly engage a torch body of the contact start plasma arc cutting torch and a distal end located substantially opposite of the proximal end along the longitudinal axis. The distal end defines a plasma exit orifice. The nozzle also includes one or more contact surfaces disposed on an interior surface of the distal end of the nozzle body. The one or more contact surfaces extends over an interior conical surface of the nozzle and shaped to physically contact an electrode of the contact start plasma arc cutting torch during a portion of a pilot arc initiation process of the torch. A combined area of the one or more contact surfaces is at least 0.015 square inches.

In some embodiments, the physical contact between the electrode and the nozzle is configured to support transmission of a pilot arc current between the electrode and the nozzle with a density of at least about 3000 amps per square inch.

In some embodiments, the one or more contact surfaces are disposed radially around a circumference of the internal surface of the nozzle. The one or more contact surfaces can be radially discontinuous and form discontinuous circumferential contacts between the electrode and the nozzle during the portion of the pilot arc initiation process. The nozzle can further include one or more channels disposed on the internal surface of the nozzle. The one or more channels can be interspersed radially among the one or more contact surfaces to permit a pre-flow of plenum gas between the nozzle and the electrode during the portion of the pilot arc initiation process.

In some embodiments, the one or more contact surfaces are radially contiguous to each other around the distal end and form a continuous circumferential contact between the electrode and the nozzle during the portion of the pilot arc initiation process.

In some embodiments, the one or more contact surfaces are disposed on a plurality of pads raised relative to the inner surface of a frustoconical section of the nozzle. The plurality of pads are shaped to seat against a complementary external surface of the electrode during the portion of the pilot arc initiation process.

In some embodiments, each contact surface is angled to be substantially parallel to a complementary exterior surface of the electrode.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 4A:
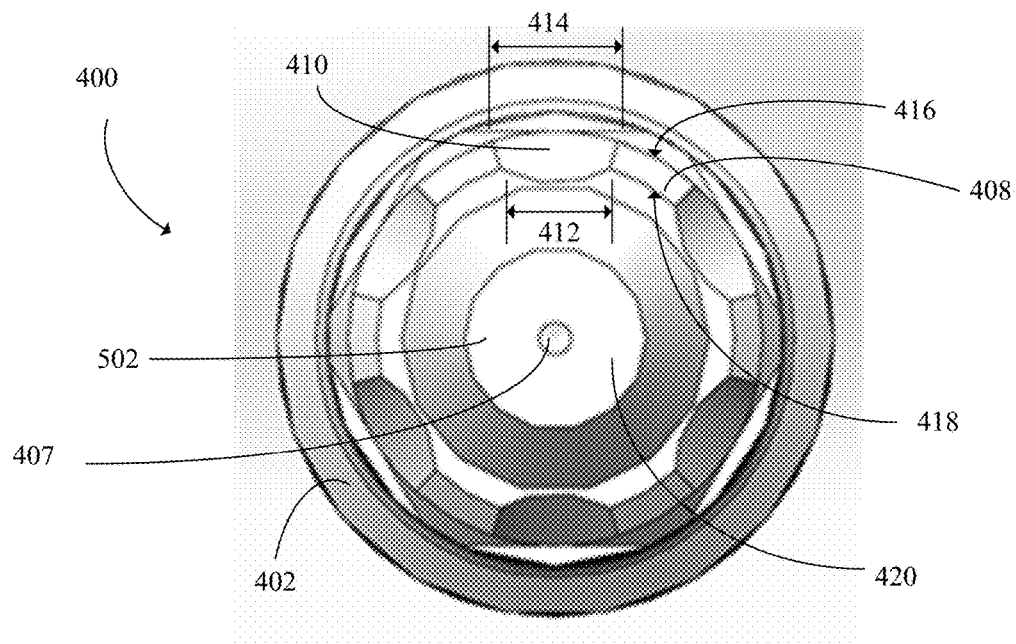
FIGS. 4a-c show an end view, a perspective view and a profile view, respectively, of an exemplary liquid-cooled electrode configured for use in a contact-start, liquid-cooled plasma arc cutting torch, according to some embodiments of the present invention.
Figure 4B:
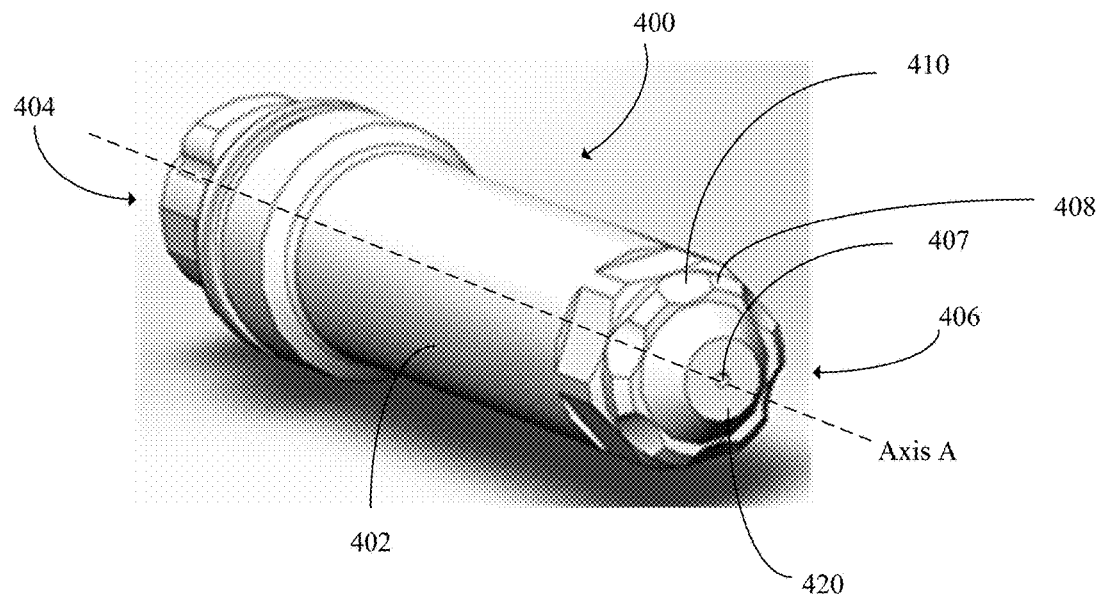
Figure 4C:
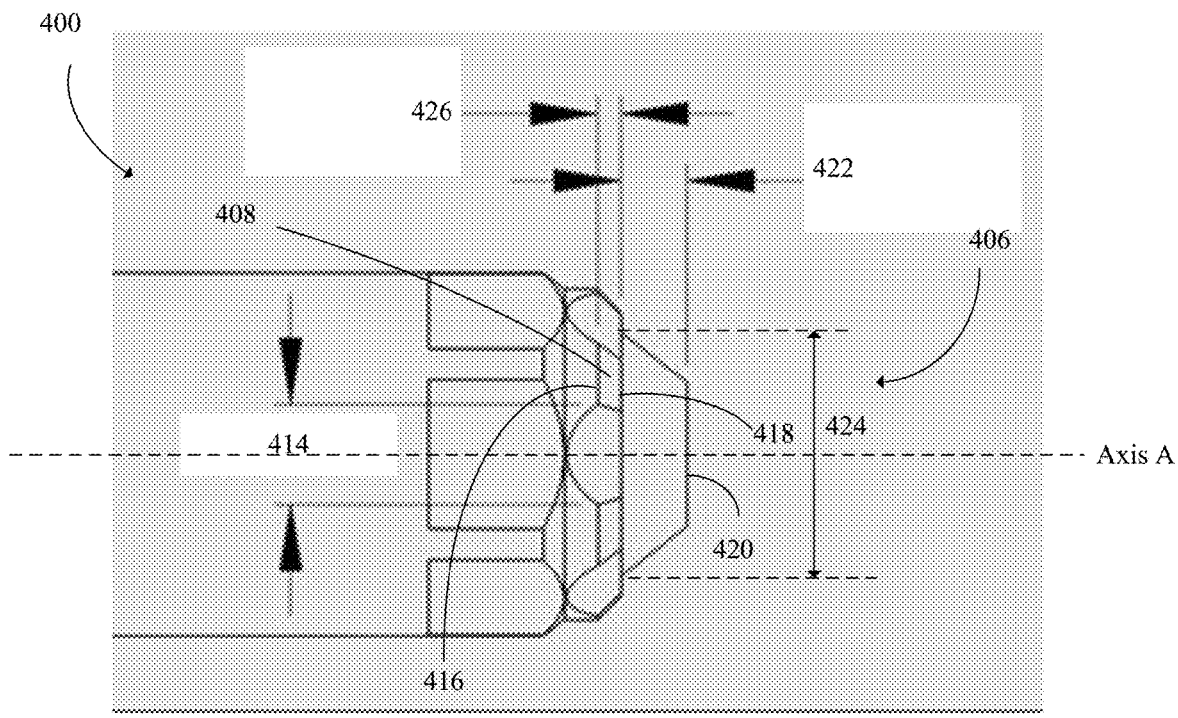

FIGS. 4a-c show an end view, a perspective view and a profile view, respectively, of an exemplary liquid-cooled electrode 400 configured for use in a contact-start, liquid-cooled plasma arc cutting torch, according to some embodiments of the present invention. For example, the electrode 400 can be used in a 50-amp contact-start, liquid-cooled plasma arc cutting torch. During contact starting, the electrode 400 and another consumable of the torch (e.g., a nozzle) are biased into physical contact with each other while a pilot arc current is conducted between the electrode 400 and the nozzle. After establishing the pilot current, the electrode 400 and the nozzle are biased away from each other to create a gap therebetween in a plenum region of the torch, while a plasma gas flow is supplied to the plenum region. The pilot arc current and the separation of the consumables cause an electrical arc to be created in the gap that ionizes the flowing plasma gas in the plenum region to produce a plasma arc (i.e., a pilot arc). In some embodiments, at least one of the electrode 400 or the nozzle is translatable within the torch (e.g., by selectively actuating blowback pressure and blow forward pressure within the torch) to achieve the physical contact and separation described herein.

As shown, the electrode 400 has an elongated body 402 defining a longitudinal axis A extending from a proximal end 404 to a distal end 406 of the electrode body 402, where the distal end 406 is the end of the electrode 400 that is positioned closest to a workpiece (not shown) when processing the workpiece, and the proximal end 404 is the end that is opposite of the distal end 406. The distal end 406 of the electrode body 402 includes an emissive insert 407 with an emission surface that is exposed on a distal end face 420 of the electrode 400. The emissive insert 407 can be made of hafnium or other materials that possess suitable physical characteristics, including corrosion resistance and a high thermionic emissivity. The distal end 406 of the electrode body 402 can comprise a frustoconical section that tapers toward the emissive insert 407. The electrode body 402 can be substantially hollow for conducting a liquid coolant therein.

As described above, the distal end 406 of the electrode 400 is adapted to be biased into contact or away from another consumable (e.g., a nozzle) during contact starting. In some embodiments, one or more contact surfaces 408 are formed on an external surface of the distal end 406 of the electrode body 402 to physically contact a nozzle during at least a portion of the contact starting process. The one or more contact surfaces 408 are shaped to complement the nozzle (e.g., an interior nozzle surface, a plenum, etc.). Generally, the one or more contact surfaces 408 are configured to support transmission of a pilot arc current between the electrode 400 and the nozzle when they are in physical contact with each other, where the pilot arc current may have a current density of at least about 3000 amps per square inch. For example, the transmission current density can be about 5000 amps per square inch. In some embodiments, the pilot arc current supported is between about 9 amps and about 60 amps. In some embodiments, the transmission current density supported by the contact surfaces 408 is from about 100 amps per square inch to about 3750 amps per square inch. In some embodiments of electrode 400, the pilot arc current density supported by the contact surfaces 408 is about 500 Amps per square inch (e.g., 9 A pilot arc current/0.016 square inches) with a transmission/operational current density of about 3125 Amps per square inch (e.g., 50 A transmission current/0.016 square inches).

In some embodiments, multiple (e.g., two or more) contact surfaces 408 are disposed circumferentially about the longitudinal axis A of the electrode body 402 on the external surface of the electrode body 402, where the multiple contact surfaces 408 are radially discontinuous in location such that they form a set of discontinuous circumferential contacts between the electrode 400 and the nozzle. In some embodiments, the discontinuity can be created by multiple non-contact regions 410 of the electrode 400 that are interspersed circumferentially among the contact surfaces 408 on the external surface of the electrode 400. For example, each non-contact region 410 can be positioned circumferentially between a pair of the contact surfaces 408.

In some embodiments, each contact surface 408 is disposed on a pad raised above a surface of the frustoconical section at the distal end 406 of the electrode 400. These pads are shaped to seat against an internal surface of the nozzle when the electrode 400 is in physical contact with the nozzle for pilot arc initiation. In some embodiments, each contact surface 408 has a surface area of greater than about 0.002 square inches. A combined surface area of the contact surfaces 408 can be greater than about 0.015 square inches. For example, in the electrode 400 of FIGS. 4a-c (which can be used in a 50-amp contact-start, liquid-cooled plasma arc cutting torch), each contact surface 408 can have a surface area of about 0.003 square inches to form a combined surface area of all six contact surfaces 408 of about 0.016 square inches.

In some embodiments, each non-contact region 410 is a channel disposed on the exterior surface of the electrode body 402 and interspersed among the contact surfaces 408. Each channel 410 can be substantially arcuate relative to the contact surfaces 408 to allow a fluid to flow therethrough even when the contact surfaces 408 are in physically contact with the corresponding interior surface of the nozzle. Thus, when the nozzle and electrode are in contact, these channels 410 form flow passages about the distal end 406 of the electrode 400 that allow discrete streams of plasma gas to pre-flow through the plenum region during contact between the electrode 400 and the nozzle as well as prior to this contact breaking. In general, parameters associated with the channels 410 (e.g., width, depth, shape, etc.) can be tailored to control and influence pre-flow and swirl and other desired process parameters. For example, the channels 410 can be canted and/or slanted so that a swirl is induced in the plasma cutting gas flow. In some embodiments, each channel 410 has a radial width of at least 0.05 inches. Specifically, as shown in FIG. 4a, each channel 410 can have a first channel width 412 at the bottom of the channel 410 that is smaller than a second channel width 414 that is at the top, exposed opening of the channel 410. If the electrode 400 is used in a 50-amp plasma arc cutting torch, the first channel width 412 can be configured to be about 0.01 inches and the second channel width 414 can be configured to be about 0.1 inches. In addition, each channel 410 can have a surface area of about 0.007 square inches to form a combined surface area of all six channels 410 of about 0.04 square inches.

As shown in the embodiments of FIGS. 4a-c, the electrode 400 has six contact surfaces 408 interspersed among six non-contact regions (e.g., channels) 410. The contact surfaces 408 and/or the non-contact regions 410 can be uniformly distributed around a circumference on the external surface of the electrode 400, such that they facilitate substantially symmetrical plasma arc initiation and transition through a bore of the nozzle. Alternatively, the contact surfaces 408 and/or the non-contact regions 410 can be asymmetrically distributed around a circumference of the external surface of the electrode body 402 to influence a direction of plasma arc initiation and transition through a bore of the nozzle. In general, the contact surfaces 408 and/or the non-contact regions 410 can be uniformly or non-uniformly distributed around a circumference of the electrode 400. Further, the shape, size and/or number of the contact surfaces 408 and/or the non-contact regions 410 can vary while still remaining within the scope of the present invention.

In some embodiments, the one or more contacts surfaces 408 are radially contiguous to one another around a circumference of an exterior surface at the distal end 406 of the electrode 400 to form a continuous circumferential contact (e.g., a single circumferential band of contact) with the corresponding nozzle surface. The surface area of this band of contact surface 408 can be greater than about 0.015 square inches. Thus, no non-contact regions 410 are present in such a design.

In general, the larger overall contact surface area provided by the contact surface(s) 408 decreases current density of the current transmitted between the electrode 400 and the nozzle, thus reducing Joule heating/resistive heating between these consumables that can damage the consumables. The shape, size, and location of the contact surface(s) 408 also improve seating between the electrode 400 and nozzle during contact. In some embodiments, each of the one or more contact surfaces 408 is conical in shape. As shown in FIG. 4c, each contact surface 408 can be bound by a proximal edge 416 and a distal edge 418 along the longitudinal axis A, where the proximal edge 416 is longer than the distal edge 418 due to the conical shape of the contact surface 408. In some embodiments, each of the one or more contact surfaces 408 is substantially axially parallel to the longitudinal axis A. In some embodiments, each contact surface 408 is axially angled relative to the longitudinal axis A, such that the conical angle of each contact surface 408 conforms (i.e., is parallel) to and complements the conical interior surface of the corresponding nozzle. For example, the conical angle of each contact surface 408 can be about 45 degrees.

Figure 2A:
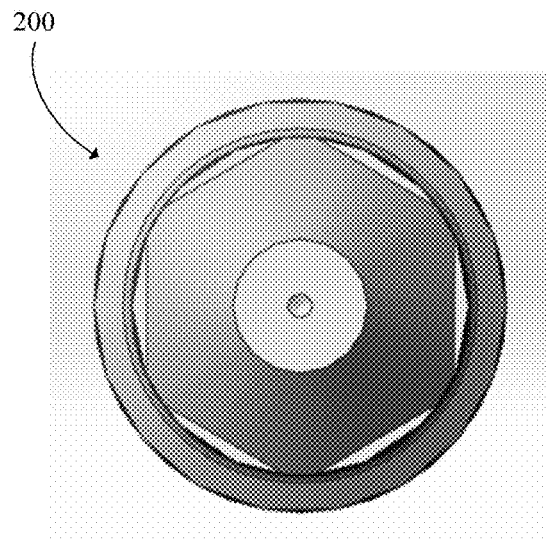
FIGS. 2a and 2b show an end view and a perspective view, respectively, of another prior art electrode.
Figure 2B:
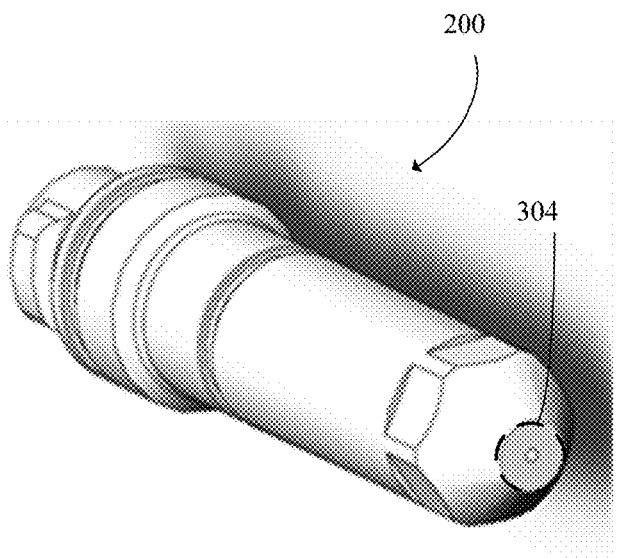

In some embodiments, as shown in FIG. 4c, the one or more contact surfaces 408 are generally located proximal to the end face 420 at the distal end 406 of the electrode 400. For example, an axial distance 422 of at least between about 0.06 and 0.08 inches (e.g., about 0.074 inches) can separate the distal end face 420 of the electrode 400 and the distal edge 418 of a contact surface 408. In traditional contact start electrodes (e.g., electrode 200 of FIGS. 2a and b), this axial distance that represents the location of the contact surface relative to the distal end face of the electrode is much shorter. For example, as shown in FIG. 2b, the line of contact 304 for the prior art electrode 200 is right along the distal end face of the electrode (e.g., making this axial distance essential 0). Thus, the one or more contact surfaces 408 are more axially spaced away from the emissive insert 407 and toward the proximal end 404 of the electrode 400 in comparison to traditional electrodes, which minimizes damage and/or deformation during plasma arc generation and transfer. In some embodiments, the axial setback distance 422 is about 3% to about 7% of the overall length of the electrode 400 (e.g., with an electrode length of about 2 inches). In addition, as described above, the one or more contact surfaces 408 are located circumferentially over an exterior surface of the electrode. A diameter 424 of the circumference around the electrode 400 formed by the distal edge(s) of the one or more contact surfaces 408 can be greater than about 0.2 to 0.3 inches, such as about 0.25 inches. Further, each of the contact surfaces 408 can extend significantly over at least one of an axial direction and/or a radial direction, such as over an axial length 426 of at least about 0.015 to about 0.03 inches (e.g., about 0.025 inches) between its proximal edge 416 and distal edge 418 and a radial width of between about 0.06 inches and about 0.08 inches. In some embodiments, the axial length 426 of each contact surface 408 is between about 1% and about 5% of the overall length of the electrode 400 (e.g., between about 0.02-0.08 inches in pad length on an electrode of length between about 1.5 inches to 2 inches). In embodiments where non-contact regions (e.g., channels) 410 are present, the second channel width 414 of each channel 410 can span a radial distance of at least about 0.05 inches to about 0.15 inches, such as about 0.1 inches, as described above. In some embodiments contact surfaces are spaced axially back from the distal tip at least twice their axial length (e.g., a contact surface with axial length of about 0.03 inches axial length is located back from the distal tip at least 0.06 inches). In some embodiments contact surfaces are spaced axially back from the distal tip at least their circumferential width (e.g., a contact surface with circumferential width of about 0.06 inches is located back from the distal tip at least 0.06 inches).

Figure 5:
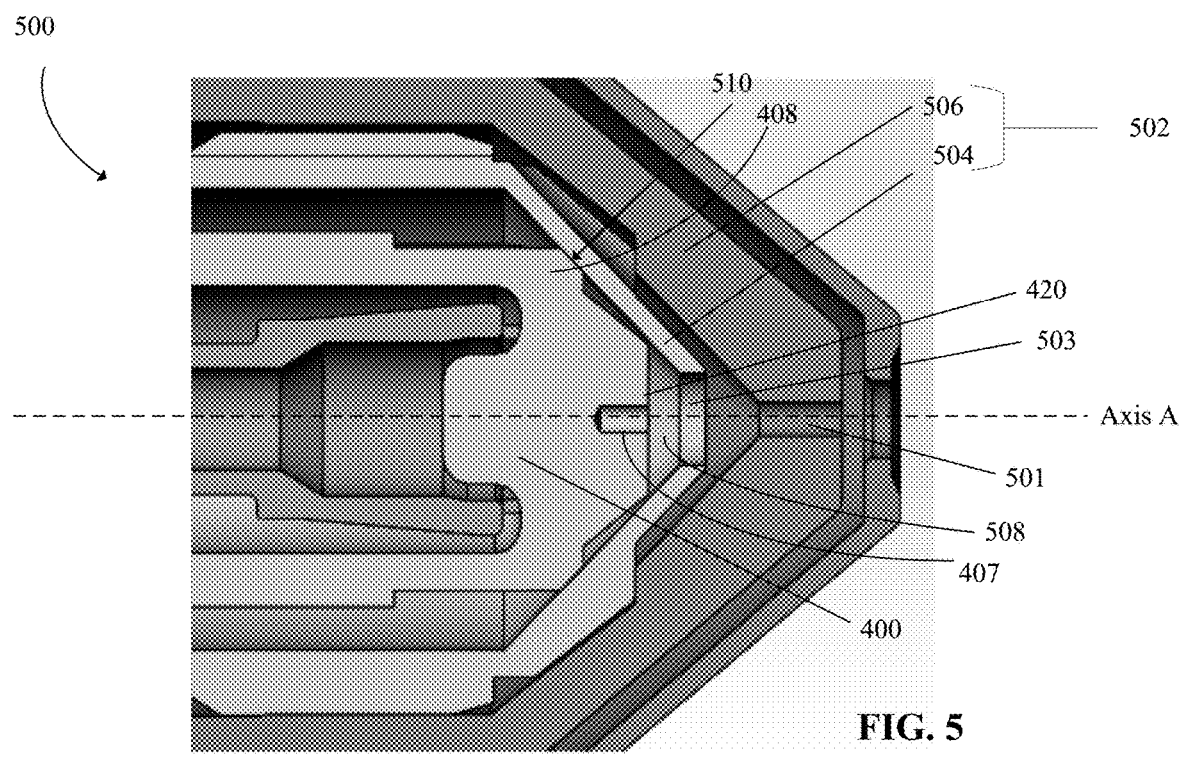
FIG. 5 shows the electrode of FIGS. 4a-c assembled inside of an exemplary liquid cooled, contact start plasma arc cutting torch, according to some embodiments of the present invention.

FIG. 5 shows the electrode 400 of FIGS. 4a-c assembled inside of an exemplary liquid cooled, contact start plasma arc cutting torch 500, according to some embodiments of the present invention. As shown, the torch 500 includes a two-piece nozzle 502 having an inner liner 504 to which the electrode 400 makes contact, and an outer body 506 substantially surrounding the nozzle liner 504. A liner bore 503 is disposed in the nozzle liner 504 and a nozzle bore 501 is disposed in the nozzle body 506, both of which cooperatively define an exit orifice from which a plasma arc is expelled. In alternative embodiments, the nozzle 502 is a single piece nozzle with no nozzle liner 504 present, in which case the electrode 400 makes direct physical contact with the nozzle body 506 instead. The nozzle 502 and the electrode 400 can cooperatively define a plenum 508 therebetween, in which a plasma arc can be formed. As shown, the electrode 400 is in physical contact with an interior surface of the nozzle liner 504 during a portion of contact starting. Specifically, the contact between the electrode 400 and the nozzle liner 504 is established between the one or more contact surfaces 408 of the electrode 400 and the corresponding conical section(s) 510 of the interior surface of the nozzle liner 504. In general, the contact between the electrode 400 and the nozzle 502 are over a larger surface area than traditional consumables (e.g., over conical contact surface(s) 408 instead of a thin line of contact 304 as shown in FIG. 2b). Further, as explained above, the one or more contact surfaces 408 are moved axially back away from the bores 501, 503 and the distal end face 420 of the electrode 400 in comparison to the traditional location of contact. Such shape, area, and location of the contact surface(s) 408 are adapted to reduce damage to process critical geometric features during contact start ignition, including reducing deposition of contaminants on the nozzle liner 504 and the liner bore 501.

In some embodiments, the electrode design of FIGS. 4a-c allows plasma gas flow and pressure to be established in the plenum region 508 when the electrode 400 and the nozzle 502 are still in physical contact. Specifically, the non-contact region(s) 410 of the electrode 400 form flow channels that allow a plasma gas flow to enter the plenum region 508 and establish a desired pressure and/or flow profile prior to physical separation of the electrode 400 and the nozzle 502, when the electrode 400 and the nozzle 502 are still in contact. This allows the resulting plasma arc to transfer rapidly and optimally out of the bores 502, 503 as soon as the contact breaks between the electrode 400 and the nozzle liner 504, without waiting for optimal transfer conditions to develop/establish as with prior art sealing contact start systems.

Figure 6A:
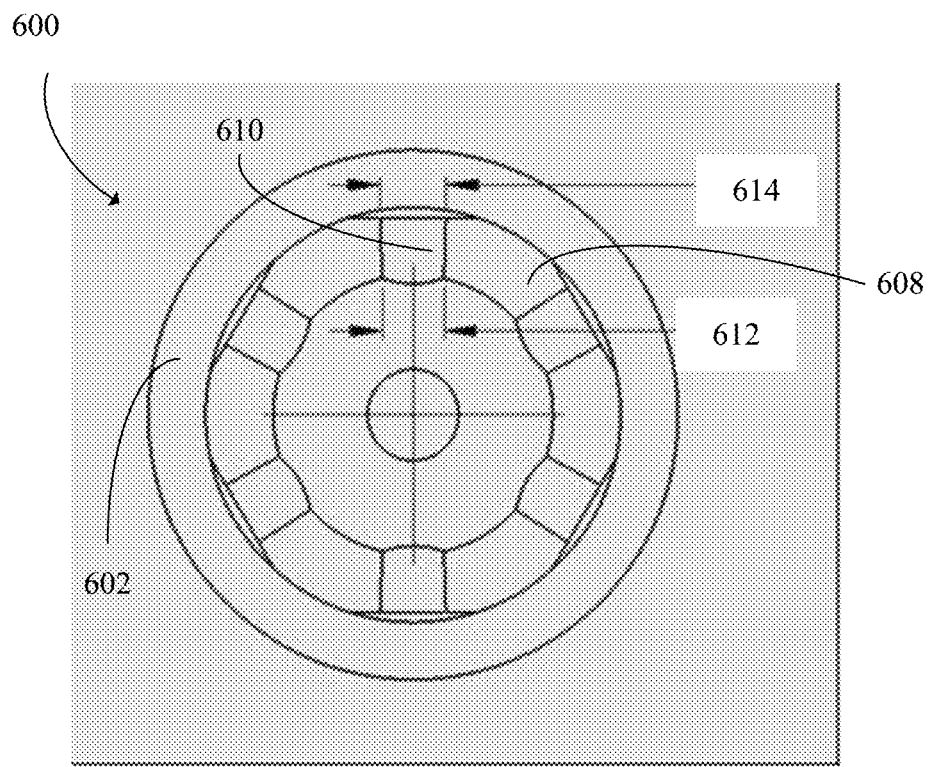
FIGS. 6a-c show an end view, a perspective view and a profile view, respectively, of another exemplary liquid-cooled electrode configured for use in a contact-start, liquid-cooled plasma arc cutting torch, according to some embodiments of the present invention.
Figure 6B:
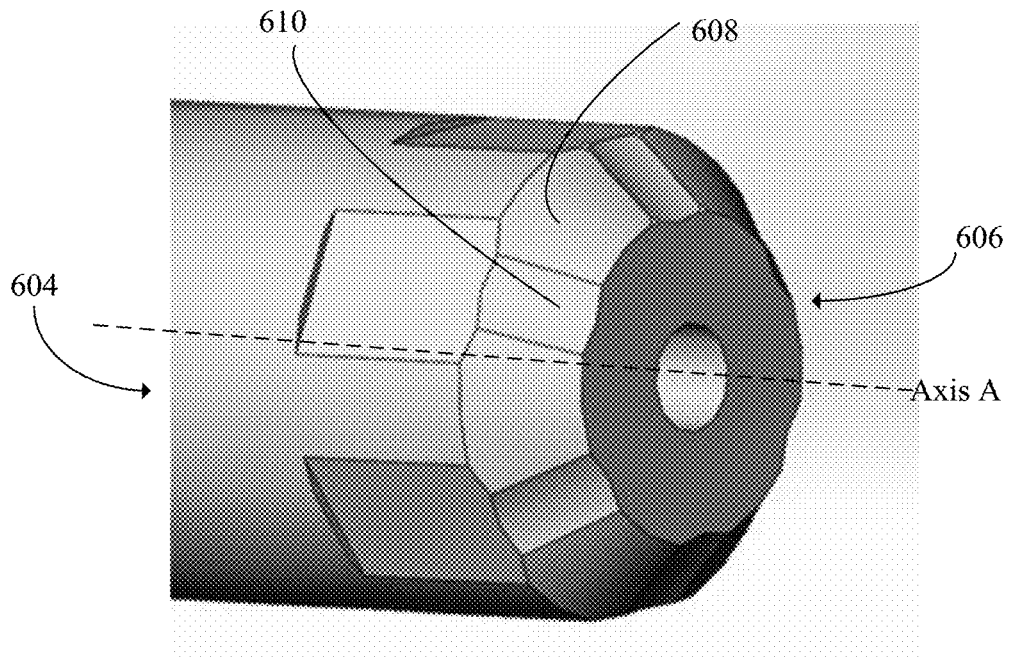
Figure 6C:
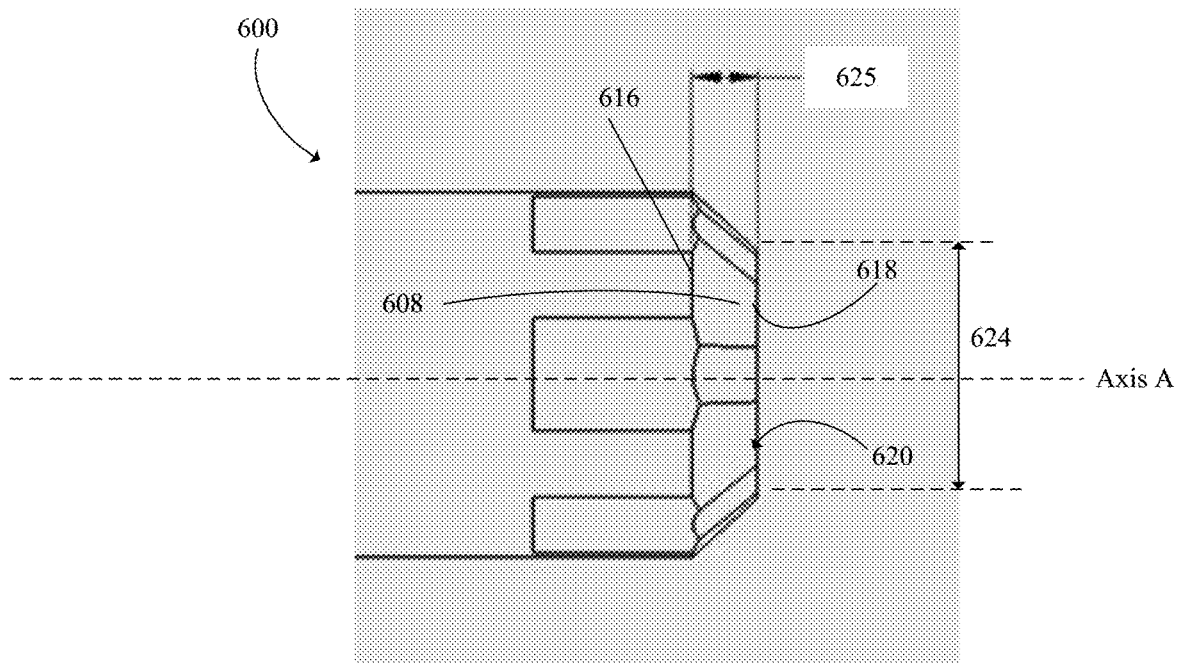

FIGS. 6a-c show an end view, a perspective view and a profile view, respectively, of another exemplary liquid-cooled electrode 600 configured for use in a contact-start, liquid-cooled plasma arc cutting torch, according to some embodiments of the present invention. For example, the electrode 600 can be used in a 300-amp contact-start, liquid-cooled plasma arc cutting torch. The electrode 600 is substantially similar to the electrode 400 of FIGS. 4a-c. As shown, the electrode 600 generally has an electrode body 602 with a proximal end 604 and a distal end 606 extending along a longitudinal axis A. One or more contact surfaces 608 are formed on an external surface of the distal end 606 of the electrode body 602 to physically contact a nozzle during a portion of contact starting.

As shown in the embodiment of FIGS. 6a-c, multiple (e.g., six) contact surfaces 608 are disposed circumferentially about the longitudinal axis A of the electrode body 602 on the external surface of the electrode body 602. The multiple contact surfaces 608 are radially discontinuous in location such that they form discontinuous circumferential contacts between the electrode 600 and the nozzle. In addition, multiple (e.g., six) non-contact regions 610 can be interspersed circumferentially among the contact surfaces 608 on the external surface of the electrode 600. For example, each non-contact region 610 can be circumferentially located between a pair of the contact surfaces 608. In general, the contact surfaces 608 and/or the non-contact regions 610 can be uniformly or non-uniformly distributed around a circumference of the electrode 600.

In some embodiments, each non-contact region 610 comprises a channel to form flow-passages for a plasma cutting gas, similar to the channels 410 for the electrode 400 of FIGS. 4a-c. Each channel 610 can have a radial width of at least about 0.05 inches. For example, as shown in FIG. 6a, each channel 610 can have a first channel width 612 at the bottom of the channel 610 that is smaller than a second channel width 614 that is at the top, exposed opening of the channel 610. If the electrode 600 is used in a 300-amp plasma arc cutting torch, the first channel width 612 can be configured to be between about 0.05 inches and about 0.07 inches (e.g., about 0.06 inches) and the second channel width 414 can be configured to be about 0.06 inches. In addition, each channel 610 can have a surface area of between about 0.005 and about 0.007 square inches (e.g., about 0.006 square inches) to generate a combined surface area of all six channels 610 of about 0.03 square inches. Further, in the embodiments where the electrode 600 has multiple contact surfaces 608, each contact surface 608 has a surface area of greater than about 0.002 square inches. A combined surface area of the contact surfaces 608 can be greater than about 0.015 square inches. For example, each contact surface 608 of the electrode 600 of FIGS. 6a-c can have a surface area of about 0.01 square inches to form a combined surface area of all six contact surfaces 608 of about 0.06 square inches. Further, each of the contact surfaces 608 can extend significantly over at least one of an axial direction and/or a radial direction, such as over an axial length 625 of at least about 0.06 to about 0.08 inches (e.g., about 0.07 inches) between its proximal edge 616 and distal edge 618 and a radial width of between about 0.07 inches and about 0.14 inches (e.g., between about 0.08 inches and about 0.13 inches). In some embodiments, the axial length 625 of each contact surface 608 is between about 3% and 7% of the overall length of the electrode 400 (e.g., between about 0.07 inches in pad length on an electrode of length between about 1.5 inches to 2 inches). In some embodiments of electrode 600, the pilot arc current density supported by the contact surfaces 608 is about 1000 Amps per square inch (e.g., 60 A pilot arc current/0.06 square inches) with a transmission/operational current density of about 5000 Amps per square inch (e.g., 300 A transmission current/0.06 square inches). In general, the size, shape and/or number of non-contact regions 610 as well as the contact surfaces 608 can vary while still remaining within the scope of the present invention.

In some embodiments, the one or more contacts surfaces 608 can be radially contiguous to each other around a circumference of an exterior surface at the distal end 606 of the electrode 600 to form a continuous circumferential contact (e.g., a single circumferential band of contact). The surface area of this band of contact surface 608 can be greater than about 0.015 square inches, such as about 0.033 square inches.

As shown in FIG. 6c, each of the one or more contact surfaces 608 is generally bound by a proximal edge 616 and a distal edge 618 along the longitudinal axis A. The distal edge 618 of a contact surface 608 can be located substantially at the distal end face 620 of the electrode 400 such that a start point of the contact surface(s) 608 have minimal axial setback relative to the distal end face 620 of the electrode 600 to maximize the contact surface areas. In some embodiments, an axial length 625 of each contact surface 608 extending from the proximal edge 616 to the distal edge 618 is about 0.07 inches. In addition, a diameter 624 of the circumference around the electrode 400 formed by the distal edge(s) 618 of the one or more contact surfaces 608 can be greater than about 0.2 inches, such as about 0.25 inches.

In some embodiments, the electrode 600 is configured to assemble inside of a 300-amp, liquid cooled, contact starting plasma arc torch, similar to the assembly of the electrode 400 in the 50-amp plasma arc torch of FIG. 5. In operation, the contact surface(s) 608 of the electrode 600 can make physical contact with corresponding interior conical surfaces of a nozzle liner (or a nozzle body if the nozzle liner is absent) during a portion of contact starting. In some embodiments, the non-contact region(s) 610 of the electrode 600 form flow channels that allow a plasma gas flow to enter the plenum region of the torch and establish a desired flow rate and/or pressure prior to physical separation of the electrode 600 and the nozzle, while the electrode 600 and the nozzle are still in contact with each other.

In general, the shape (e.g., area, width, and/or angle), number and location of the contact surfaces for the electrodes 400, 600 of FIGS. 4a-6c can be tailored to meet specific process requirements. For example, the shape of the contact surfaces may change across different amperages of operation or different types of operation (e.g., between gouging and cutting operations). In some embodiments, the shape (e.g., area, width, and/or angle), number, and/or location of the non-contact regions for the electrodes 400, 600 of FIGS. 4a-6c can vary to accommodate different processing goals, such as altering their distribution about the longitudinal axis A (e.g., asymmetric, symmetric, one-sided, etc.) to achieve a desired plasma gas flow pattern.

Figure 7:
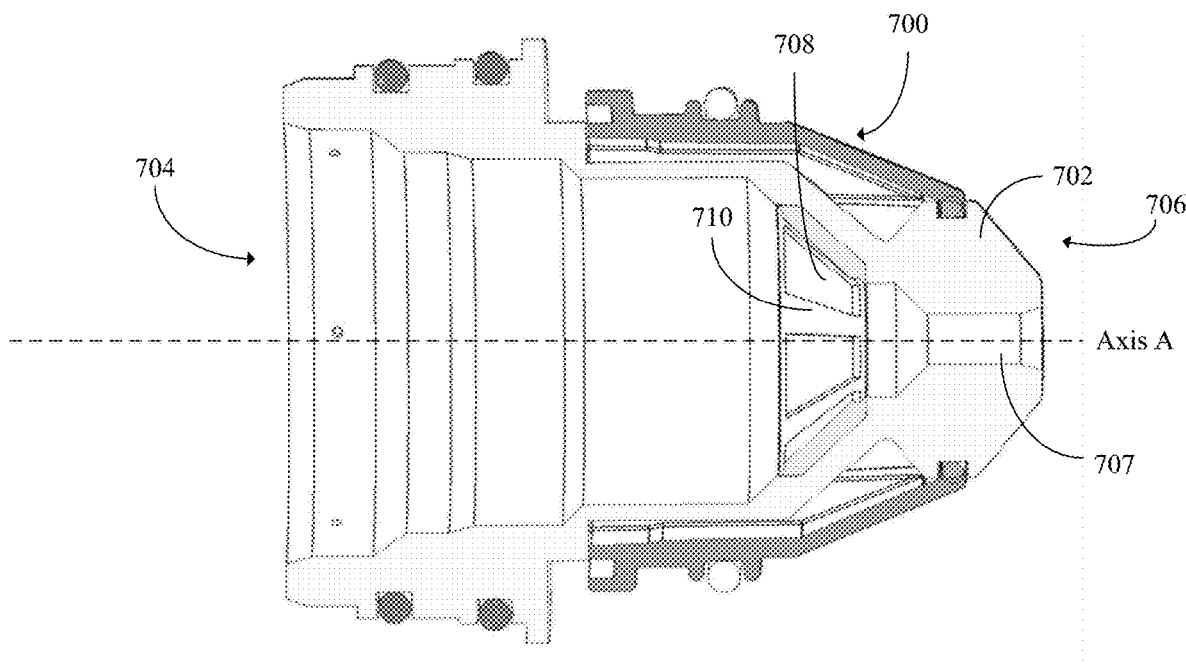
FIG. 7 shows an exemplary liquid-cooled nozzle configured for use in a contact-start, liquid-cooled plasma arc cutting torch, according to some embodiments of the present invention.

In the embodiments described above with reference to FIGS. 4a-6c, the contact features and/or non-contact regions are disposed on the electrode. In other embodiments, these features are disposed on the nozzle. In yet other embodiments, these features are distributed between the nozzle and the electrode. FIG. 7 shows an exemplary liquid-cooled nozzle 700 configured for use in a contact-start, liquid-cooled plasma arc cutting torch, where the contact features are disposed on the nozzle 700, according to some embodiments of the present invention. As shown, the nozzle 700 has a substantially hollow elongated body 702 defining a longitudinal axis A extending from a proximal end 704 to a distal end 706 of the nozzle body 702. The proximal end 704 of the nozzle 700 is shaped to matingly engage a torch body. The distal end 706 of the nozzle 700 includes a central bore 707 that serves as a plasma exit orifice from which a plasma arc is expelled during torch operations. The distal end 706 of the nozzle body 702 can comprise a frustoconical section that tapers toward the bore 707.

An electrode can be biased into or away from contact with the distal end 706 of the nozzle 700 during contact starting. In some embodiments, one or more contact surfaces 708 are formed on an interior surface of the distal end 706 of the nozzle body 702 to physically contact an exterior surface of an electrode during at least a portion of the contact starting process. The one or more contact surfaces 708 are shaped to complement the electrode, such as a frustoconical exterior surface at the distal end of the electrode. Similar to the contact surfaces 408, 608 of the electrodes 400, 600, the one or more contact surfaces 708 of the nozzle 700 are configured to support transmission of a pilot arc current between the electrode and the nozzle 700 when they are in physical contact with each other, where the pilot arc current may have a current density of at least about 3000 amps per square inch. For example, the transmission current density can be about 5000 amps per square inch. In some embodiments, the pilot arc current supported is between about 9 amps and about 60 amps. In some embodiments, the transmission current density supported by the contact surfaces 708 is from about 100 amps per square inch to about 3750 amps per square inch. In some embodiments, the pilot arc current density supported by the contact surfaces 708 is about 500 Amps per square inch (e.g., 9 A pilot arc current/0.016 square inches) with a transmission/operational current density of about 3125 Amps per square inch (e.g., 50 A transmission current/ 0.016 square inches). In some embodiments, the pilot arc current density supported by the contact surfaces 708 is about 1000 Amps per square inch (e.g., 60 A pilot arc current/0.06 square inches) with a transmission/operational current density of about 5000 Amps per square inch (e.g., 300 A transmission current/0.06 square inches).

In some embodiments, similar to the contact surfaces 408, 608 of the electrodes 400, 600, multiple (e.g., two or more) contact surfaces 708 are disposed circumferentially about the longitudinal axis A of the nozzle body 702 on the interior surface of the nozzle body 702, where the multiple contact surfaces 708 are radially discontinuous such that they form discontinuous circumferential contacts between the electrode and the nozzle 700. In some embodiments, the discontinuity can be created by multiple non-contact regions 710 of the nozzle 700 that are interspersed circumferentially among the contact surfaces 708 on the interior surface of the nozzle body 702. For example, each of the non-contact regions 710 can be positioned circumferentially between a pair of the contact surfaces 708.

In some embodiments, each contact surface 708 is disposed on a pad raised radially inward toward the electrode relative to a surface of the frustoconical section at the distal end 706 of the nozzle 700. These pads are shaped to seat against an exterior surface of the electrode when the nozzle 700 is in physical contact with the electrode for pilot arc initiation. In some embodiments, each contact surface 708 has a surface area of greater than about 0.002 square inches. A combined surface area of the multiple contact surfaces 708 can be greater than about 0.015 square inches. In some embodiments, each contact surface 708 has about the same shape and/or dimensions as the contact surfaces 408 of the electrode 400 of FIGS. 4*a-c* or the contact surfaces 608 of the electrode 600 of FIGS. 6*a-b*.

In some embodiments, each non-contact region 710 is a channel disposed on the interior surface of the nozzle body 702 and interspersed among the contact surfaces 708. Each channel 710 can be substantially arcuate relative to the contact surfaces 708 to allow a fluid to flow therethrough even when the contact surfaces 708 are in physically contact with the corresponding exterior surface of the electrode. Thus, these channels 710 form flow passages about the distal end 706 of the nozzle 700 that allow discrete streams of plasma gas to pre-flow through the plenum region during contact between the electrode and the nozzle 700 and prior to this contact breaks. In some embodiments, the channels 710 are canted and/or slanted so that a swirl is induced in the plasma cutting gas flow. In some embodiments, each channel 710 has about the same shape and/or dimensions as the channels 410 of the electrode 400 of FIGS. 4*a-c* or the channels 610 of the electrode 600 of FIGS. 6*a-b*.

In some embodiments, the nozzle 700 has six contact surfaces 708 interspersed among six non-contact regions (e.g., channels) 710. The contact surfaces 708 and/or the non-contact regions 710 can be uniformly distributed around a circumference on the interior surface of the nozzle, as shown in FIG. 7, such that they facilitate substantially symmetrical plasma arc initiation and transition through the nozzle bore 707. Alternatively, the contact surfaces 708 and/or the non-contact regions 710 can be asymmetrically distributed around a circumference of the interior surface of the nozzle body 702 to influence a direction of plasma arc initiation and transition through the nozzle bore 707. In general, the size, shape, number and/or locations of the contact surfaces 708 and the non-contact regions 710 can vary while still remaining within the scope of the present invention.

In some embodiments, the one or more contacts surfaces 708 are radially contiguous to one another around a circumference of an interior surface at the distal end 706 of the nozzle 700 to form a continuous circumferential contact (e.g., a single circumferential band of contact). The surface area of this band of contact surface 708 can be greater than about 0.015 square inches. Thus, no non-contact regions 710 are present in such a design/embodiment.

In some embodiments, each of the one or more contact surfaces 708 is frustoconical in shape. In some embodiments, each of the one or more contact surfaces 708 is substantially axially parallel to the longitudinal axis A. In some embodiments, each contact surface 408 is axially angled relative to the longitudinal axis A, such that the conical angle of each contact surface 708 conforms (i.e., is parallel) to and complements the conical exterior surface of the corresponding electrode. For example, the conical angle of each contact surface 708 can be about 45 degrees.

In some embodiments, the resulting contact between the nozzle 700 and an electrode are over a larger surface area than traditional consumables because the contact is over conical contact surface(s) 708 instead of a thin line of contact 304 as shown in FIG. 2*b*. Further, the one or more contact surfaces 708 are moved axially back away from the nozzle bore 707 and the distal end face of the electrode in comparison to the traditional location of contact. Such shape, area, and location of the contact surface(s) 708 reduces damage to process critical geometric features during contact start ignition. In some embodiments, the nozzle design of FIG. 7 allows plasma gas flow and pressure to be established through the plenum region when the electrode and the nozzle 700 are still in physical contact. Specifically, the non-contact region(s) 710 of the nozzle 700 form flow channels that allow a plasma gas flow to enter the plenum and establish a desired pressure prior to physical separation of the electrode and the nozzle 700, while the electrode and the nozzle 700 are still in contact.

Figure 8:
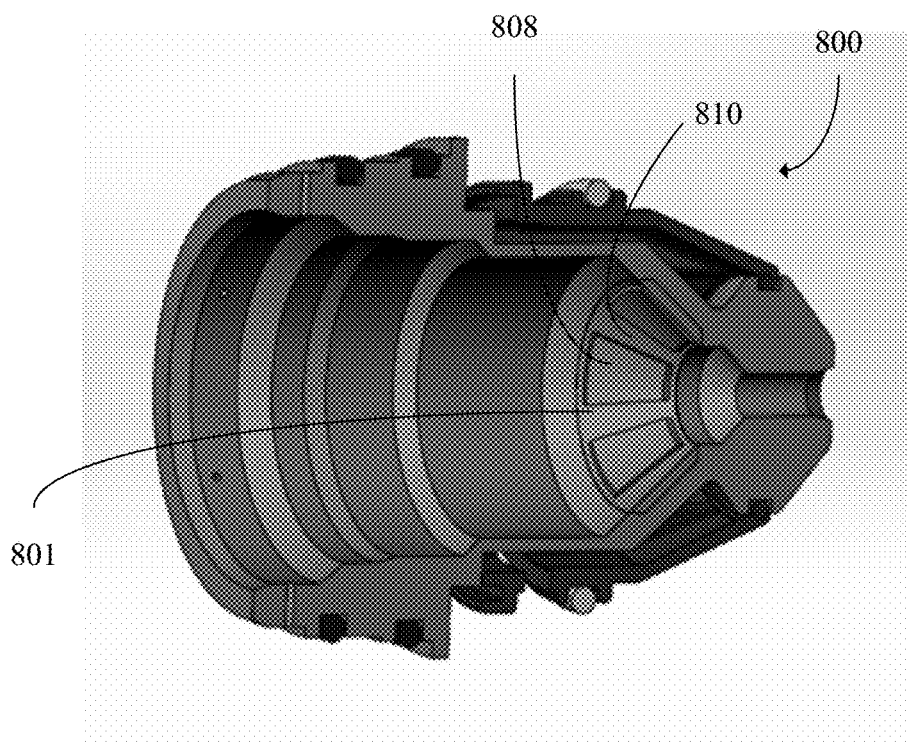
FIG. 8 shows another exemplary liquid-cooled nozzle configured for use in a contact-start, liquid-cooled plasma arc cutting torch, according to some embodiments of the present invention.

In another aspect, the contact and non-contact features described herein can be formed on one or more inserts coupled to an exterior surface of an electrode and/or to an interior surface of a nozzle. FIG. 8 shows another exemplary liquid-cooled nozzle 800 configured for use in a contact-start, liquid-cooled plasma arc cutting torch, where the contact features are disposed on an insert 801 of the nozzle 800, according to some embodiments of the present invention. As shown, the insert 801 is configured to couple to a circumferential section of the interior surface of the nozzle 800. The insert 801 can be substantially frustoconical in shape. In some embodiments, the insert 801 is made from an electrically conductive material, such as silver. One or more contact surfaces 808 and/or non-contact regions 810 are formed onto the insert 801 instead of on the nozzle 800 itself. The contact surfaces 808 are substantially the same as the contact surfaces 708 described above with respect to the nozzle 700 of FIG. 7, and the non-contact regions 810 are substantially the same as the non-contact regions 710 described above with respect to the nozzle 700 of FIG. 7. In some embodiments, the location of the insert 801 relative to the nozzle 800 is such that the contact surfaces 808 and/or non-contact regions 810 of the insert 801 are at about the same location as the contact surfaces 708 and non-contact regions 710 on the nozzle 700 of FIG. 7.

Figure 9:
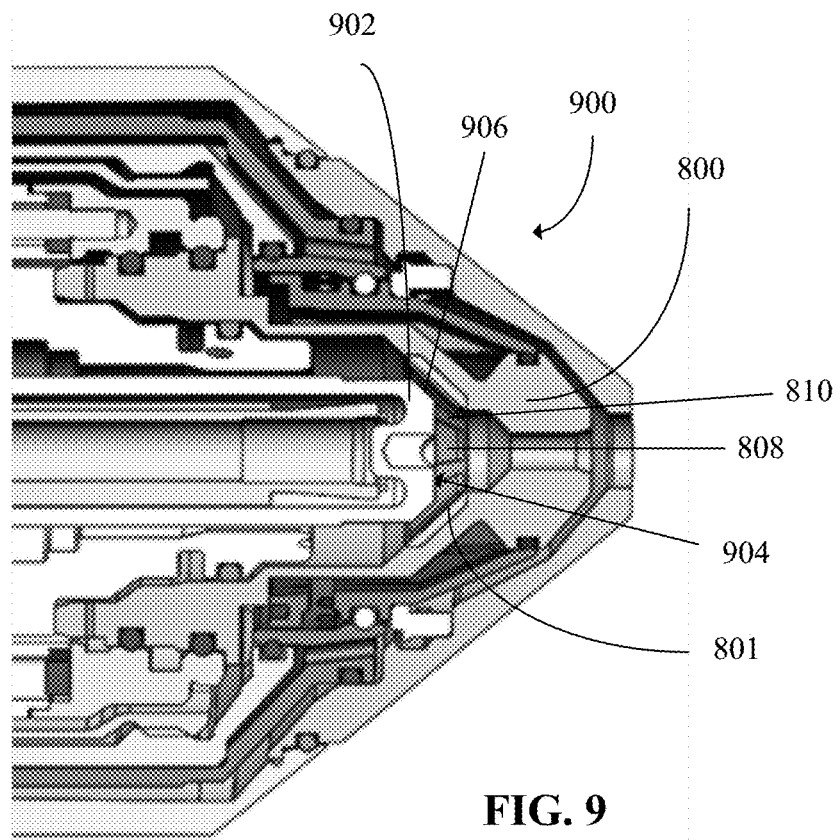
FIG. 9 shows the nozzle of FIG. 8 assembled inside of an exemplary liquid cooled, contact start plasma arc cutting torch, according to some embodiments of the present invention.

FIG. 9 shows the nozzle 800 of FIG. 8 assembled inside of an exemplary liquid cooled, contact start plasma arc cutting torch 900, according to some embodiments of the present invention. In some embodiments, the torch 900 is a 300-amp contact-start, liquid-cooled plasma arc cutting torch, and the nozzle 800 is suitably configured to support torch operation at such a current level. As shown, the torch 900 includes an electrode 902 with a distal tip 904 that is substantially surrounded by the insert 801 of the nozzle 800. During a portion of contact starting when the electrode 902 and the nozzle 800 are biased into contact with each other, a circumferential surface 906 at the distal end of the electrode 902 is adapted to make physical contact with the contact surfaces 808 of the nozzle insert 801 to form a seal at these interfaces. Yet, a plasma cutting gas can still flow between the electrode 902 and the nozzle 800 during such physical contact through the non-contact regions 810 (e.g., channels) etched into the nozzle insert 801. In some embodiments, an insert (not shown) can be coupled to the electrode 902 in addition to the nozzle insert 801, where the electrode insert can have certain contact and/or non-contact features. In some embodiments, only an electrode insert is present without the nozzle insert 801, where the electrode insert has contact and/or non-contact features disposed thereon. In some embodiments, the insert can comprise raised pads affixed to either the nozzle 800 or the electrode 902. In some embodiments, the insert is comprised of electrically conductive materials such as tungsten, silver, etc.

Figure 10:
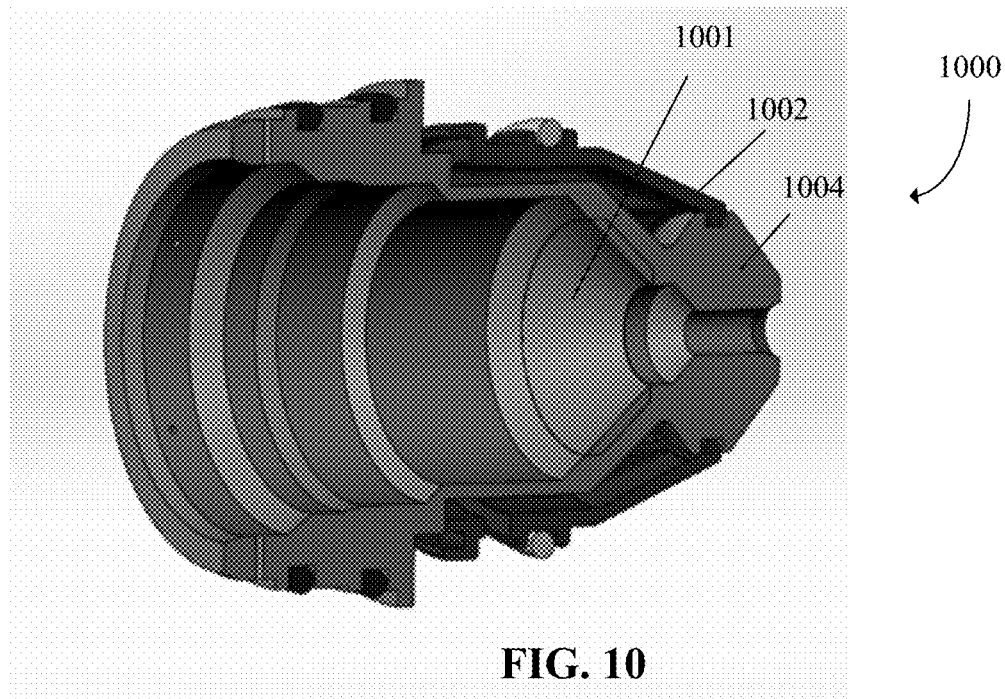
FIG. 10 shows yet another exemplary liquid-cooled nozzle configured for use in a contact-start, liquid-cooled plasma arc cutting torch, according to some embodiments of the present invention.
Figure 11:
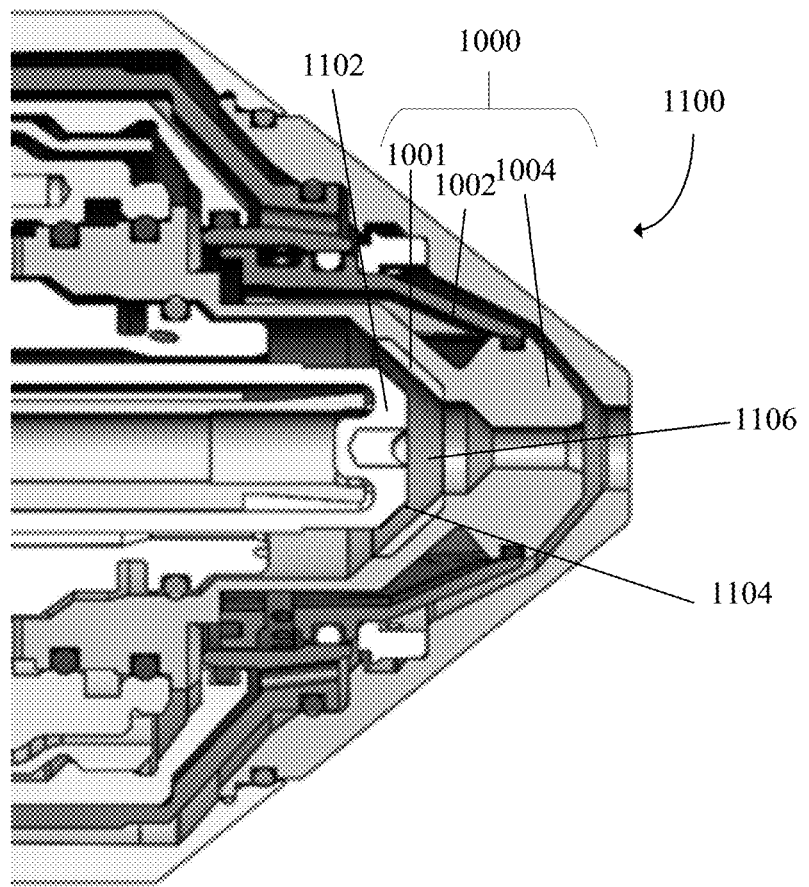
FIG. 11 shows the nozzle of FIG. 10 assembled inside of an exemplary liquid cooled, contact start plasma arc cutting torch, according to some embodiments of the present invention.

In some embodiments, an insert for a nozzle or for an electrode does not include any non-contact regions circumferentially interspersed among the contact surfaces. Instead, the insert has a relatively smooth interior surface to form a substantially even, circumferential band of contact with the corresponding consumable. FIG. 10 shows yet another exemplary liquid-cooled nozzle 1000 configured for use in a contact-start, liquid-cooled plasma arc cutting torch, where the nozzle 1000 has (i) a nozzle body 1002 and (ii) a nozzle liner 1004 that includes a relatively smooth insert 1001, according to some embodiments of the present invention. The insert 1001 can be substantially hollow and frutoconical-shaped to matingly engage an interior surface of the nozzle liner 1004. The insert 1001 may be constructed from one or more of copper, brass, silver, stainless steel, etc. In some embodiments, the insert 1001 may include materials with a higher melting point and a lower electrical conductivity in comparison to copper, yet still provide a source for pilot current and arc generation by way of proximity/contact. FIG. 11 shows the nozzle 1000 of FIG. 10 assembled inside of an exemplary liquid cooled, contact start plasma arc cutting torch 1100, according to some embodiments of the present invention. The torch 1100 can be a 300-amp contact-start, liquid-cooled plasma arc cutting torch, and the nozzle 1000 can be suitably configured to support torch operation at such a current level. As shown, an interior surface of the nozzle insert 1001 is relatively smooth (i.e., does not have any irregular features). The nozzle insert 1001 is adapted to form a portion of a surface that defines the plenum 1106 between the electrode 1102 and the nozzle 1000. In operation when the nozzle 1000 comes into contact with an electrode 1102 of the torch 1100, the nozzle insert 1001 is adapted to form an even, circumferential band of seal with a corresponding exterior surface 1104 at the distal end of the electrode 1102. In this configuration, no plasma gas is permitted to flow between the nozzle 1000 and the electrode 1102 while they are in physical contact with each other. In some embodiments, a similar insert can be coupled to the electrode 1102 in addition to or instead of the nozzle insert 1001, where the electrode insert can be relatively smooth with no irregular features. In some embodiments, instead of using an insert, an electrically conductive coating is applied to an interior surface of the nozzle 1000 and/or an exterior surface of the electrode 1102 to form a contact surface.

Figure 1A:
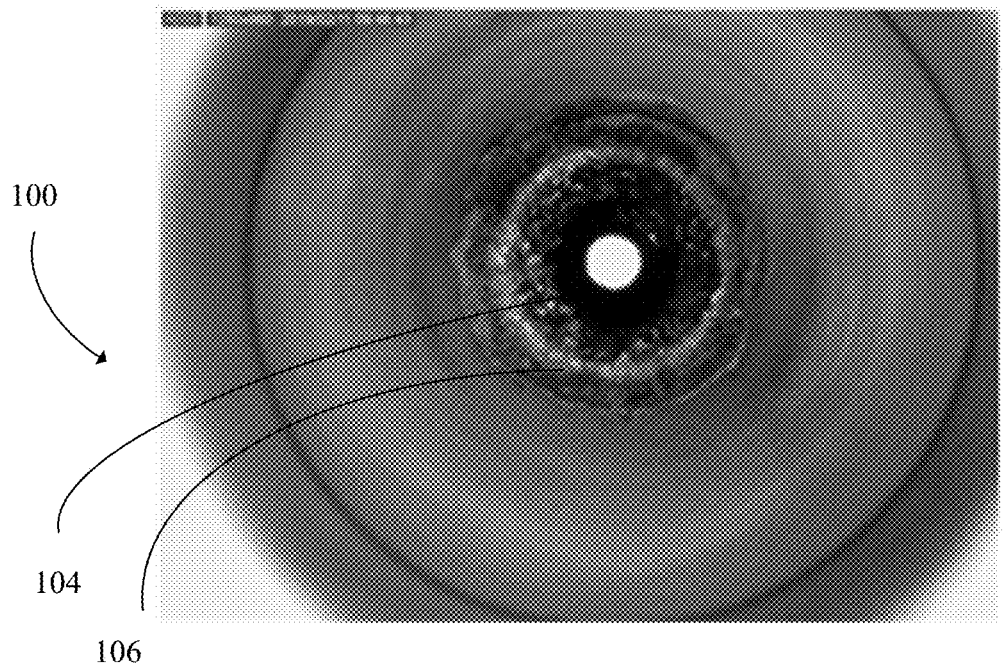
FIGS. 1a and 1b show exemplary deposition on and damage to a prior art nozzle and a prior art electrode, respectively, of a prior art contact start plasma arc cutting system.
Figure 1B:
Figure 3:
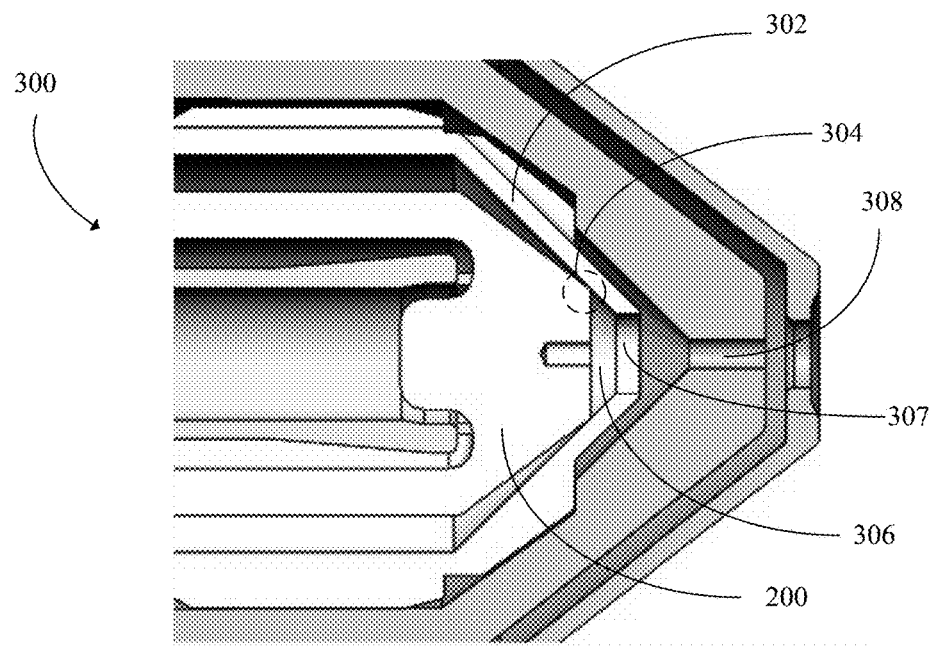
FIG. 3 shows a cross-sectional view of a portion of a prior art contact start plasma arc cutting torch that includes the electrode of FIGS. 2a and 2b.
Figure 12:
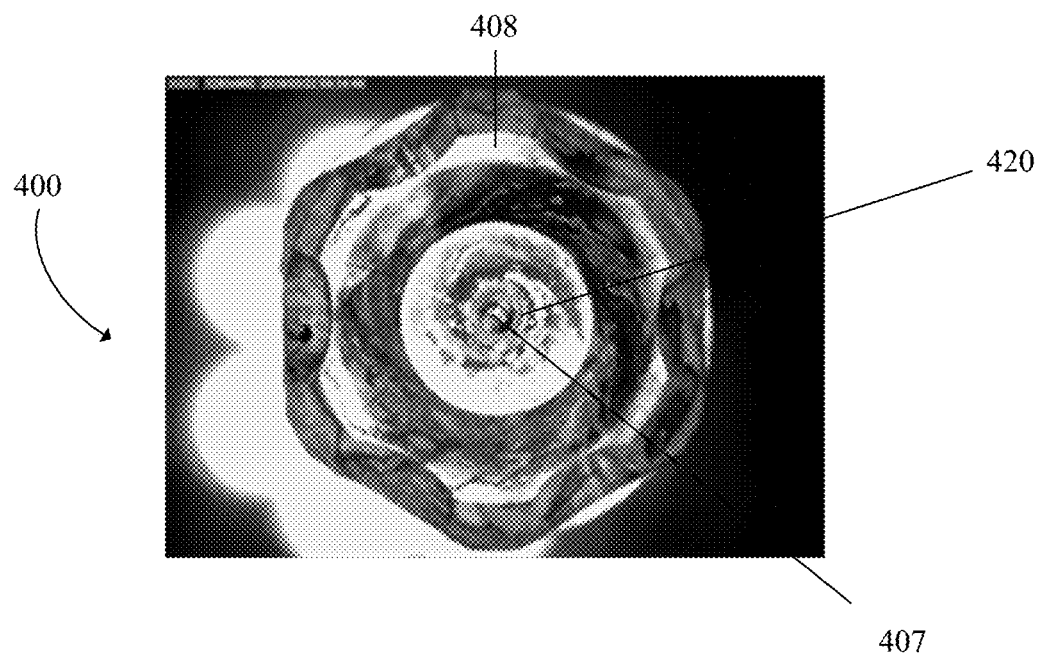
FIG. 12 illustrates an exemplary image of the electrode of FIGS. 4a-c after being used in the plasma arc cutting torch of FIG. 5 to complete about 3600 starts, according to some embodiments of the present invention.
Figure 13:
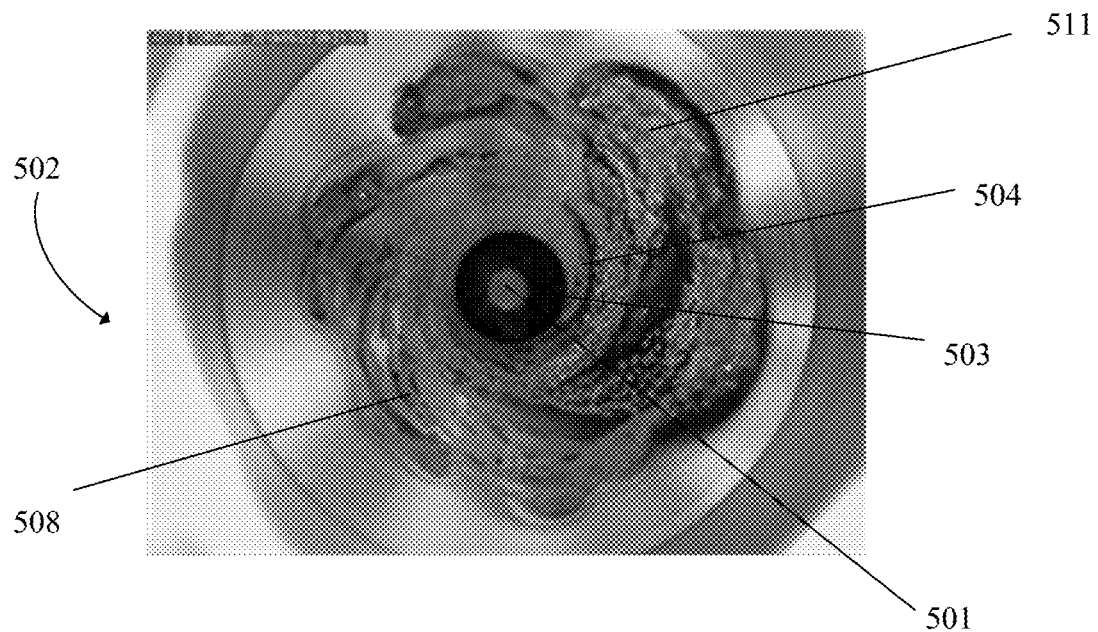
FIG. 13 illustrates an exemplary image of the nozzle of the plasma arc cutting torch of FIG. 5 after about 3600 starts, according to some embodiments of the present invention.

FIG. 12 illustrates an exemplary image of the electrode 400 of FIGS. 4a-c after being used in the plasma arc cutting torch 500 of FIG. 5 to complete about 3600 pilot arc initiations (i.e., starts), according to some embodiments of the present invention. FIG. 13 illustrates an exemplary image of the nozzle 502 of the plasma arc cutting torch 500 of FIG. 5 after about 3600 starts, according to some embodiments of the present invention. During contact starting, plasma gas pressure is already pre-established in the plenum region 508 of the torch 500 prior to the physical contact between the nozzle liner 504 and the electrode 400 is broken. Therefore, as soon as the electrode 400 and the nozzle liner 504 move away from each other, the established gas pressure in the plenum region 508 is able to rapidly expel the plasma arc through the liner bore 503 and the nozzle bore 501, thereby minimizing any thermal damage that is evident in the prior art nozzle 100 and electrode 102 of FIGS. 1a and 1b, respectively. As a result, pitting at the end face 420 of the electrode 400 (as illustrated in FIG. 12) and in the plenum region 508 of the nozzle 502 (as illustrated in FIG. 13) is significantly shallower and more distributed when compared to the prior art electrode 102 and nozzle 100 of FIGS. 1b and 1a, respectively. FIG. 13 also shows that the area of contact between the electrode 400 and nozzle 502 is moved proximally away from the liner bore 503, in comparison to the location of contact in a prior art torch (e.g., torch 300 of FIG. 3). Specifically, the contact regions 511 of the nozzle 502 are where the pitting and charring is evident in FIG. 13, which are spaced from the liner bore 503. These contact regions 511 are areas of the nozzle 502 at which the nozzle 502 physically contacts the raised contact surfaces 408 of the electrode 400. As separation occurs between the electrode 400 and the nozzle 502 during torch operation, the plasma arc forms in the plenum region 508 and is spun out of the liner bore 503 an the nozzle bore 501 to cause the visible swirl pattern in the contact regions 511 in FIG. 13. Because the contact regions 511 are located axially away from the liner bore 503, this results in a nearly intact liner bore 503 even after about 3600 starts. Further, in contrast to the prior art electrode 102 of FIG. 1b, the copper around the emissive insert 407 of the electrode 400 remains mostly intact, as illustrated in FIG. 12. FIG. 12 also illustrates the raised contact surfaces 408 on the electrode 400 at which the electrode 400 makes physical contact with the nozzle 502. In generally, various embodiments of the present invention move the area of contact between the electrode and nozzle more proximally away from process critical geometric features comprising the nozzle bores (including the nozzle body bore and the nozzle liner bore) as well as the front end face of the electrode (including the hafnium insert of the electrode). For example, as shown in the embodiments of FIGS. 4a-c and 5, an axial distance 422 separates the distal end face 420 of the electrode 400 and the distal edge 418 of the contact surfaces 408. Such axial separation protects the process critical geometric features where radial symmetry, integrity, and clarity (e.g., lack of pitting/slag accumulation thereon) are critical to fluid flow and plasma arc generation.

Figure 14:
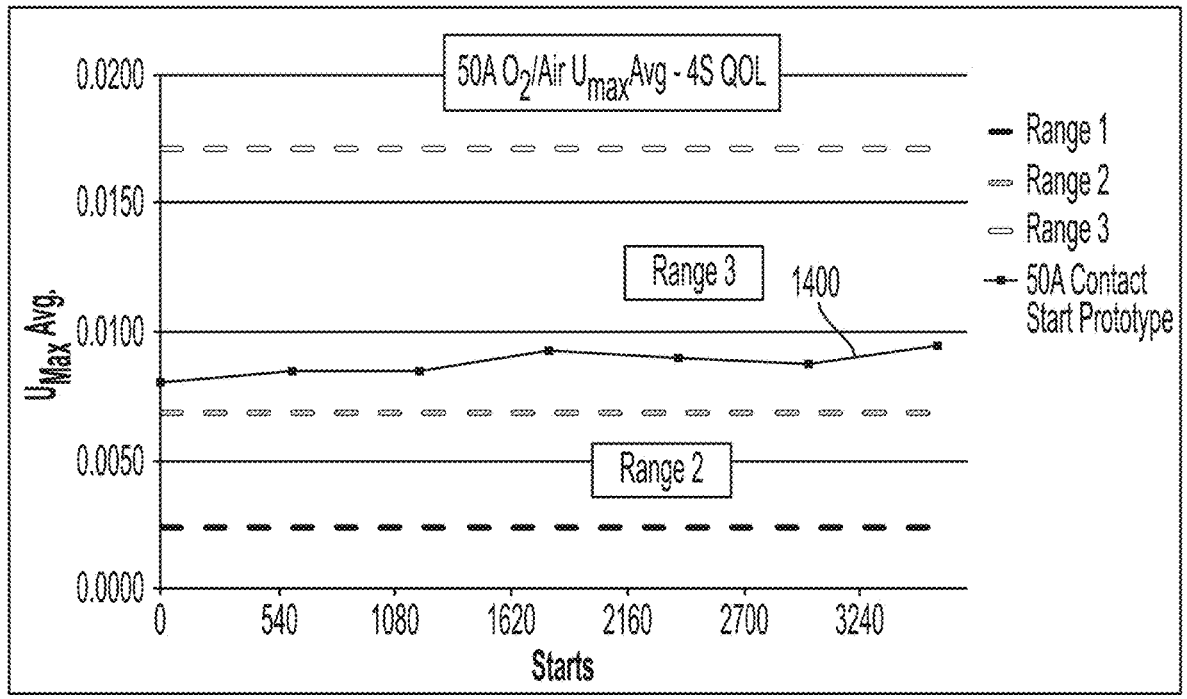
FIG. 14 shows exemplary quality-over-life (QOL) results for a plasma arc torch of the present invention operated at about 50 amps over a period of about 3600 starts, according to some embodiments of the present invention.
Figure 15:
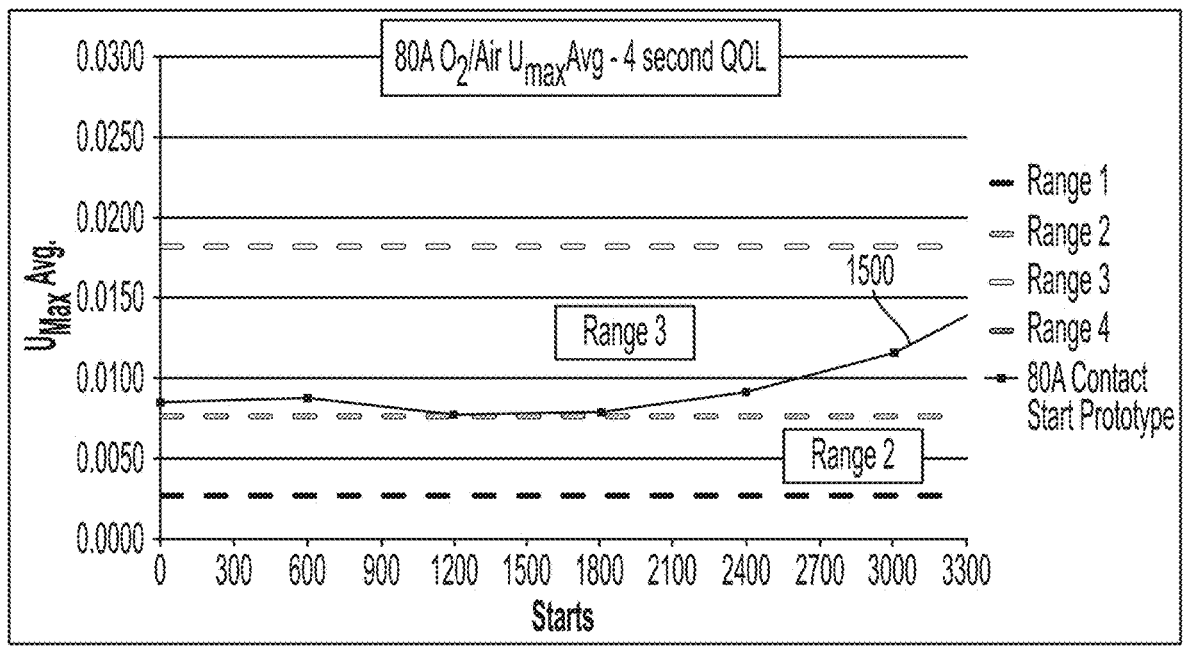
FIG. 15 shows exemplary quality-over-life (QOL) results for a plasma arc torch of the present invention operated at about 80 amps over a period of about 3600 starts, according to some embodiments of the present invention.

Because consumable damage is significantly reduced in the plasma arc torches of the present invention, cut quality over life (QOL) for these torches is extended. FIG. 14 shows exemplary quality-over-life (QOL) results for a plasma arc torch of the present invention operated at about 50 amps over a period of about 3600 starts, according to some embodiments of the present invention. FIG. 15 shows exemplary quality-over-life (QOL) results for a plasma arc torch of the present invention operated at about 80 over a period of about 3600 starts, according to some embodiments of the present invention. In some embodiments, the torches used to generate the graphs of FIGS. 14 and 15 have similar configurations as the torch 500 of FIG. 5. The relatively flat traces 1400, 1500 in the graphs of FIGS. 14 and 15 indicate that stable and consistent cut quality was achieved over the long duration of torch processing (i.e., over 3600 starts). As shown, there was not much difference in cut quality between the first few cuts (i.e. with new consumables) and the cuts made after the same consumables had accumulated 3600 starts.

As described above, the consumables (e.g., electrodes and nozzles) of the present invention are configured to minimize damage to process critical geometric features on consumables during contact start ignition. Such damage reduction is accomplished in a number of ways, including moving the contact area (e.g., between an electrode and a nozzle inside of a torch) away from the liner/nozzle bore(s) where process critical geometric features of the consumables are located, increasing the contact surfaces so that an overall large contact surface area is created which reduces pilot current density, and/or forming one or more flow channels between the consumables when they are in contact with each other to allow a plasma flow rate/pressure to be established in the plenum which drives rapid arc transfer after physical contact breaks between the consumables. The resulting rapid arc transfer allows minimum heat energy transfer into the consumables, thereby reducing thermal damage to the consumables and thus helping to extend consumable life and improve cut quality consistency. Even though in various embodiments of the invention the electrodes are described as the dynamic component (i.e., the electrode configured to be biased into or away from the nozzle), a dynamic nozzle capable of being translated relative to the electrode is also within the scope of the present invention.

Within the context of the present invention, the term "about" in relation to a particular value can be construed as covering a range of ±5% deviation from the particular value. It should be understood that various aspects and embodiments of the invention can be combined in various ways. Based on the teachings of this specification, a person of ordinary skill in the art can readily determine how to combine these various embodiments. Modifications may also occur to those skilled in the art upon reading the specification.

What is claimed is:

1. A liquid cooled electrode for a contact start plasma arc cutting torch, the liquid cooled electrode comprising:
   an elongated body defining a longitudinal axis, the elongated body including a proximal end shaped to matingly engage a torch body of the contact start plasma arc cutting torch and a distal end located substantially opposite of the proximal end along the longitudinal axis, the distal end including an emissive insert; and
   one or more contact surfaces disposed on an external surface of the distal end of the electrode body between the proximal and distal ends, the one or more contact surfaces shaped to physically contact a nozzle disposed within the contact start plasma arc cutting torch during a portion of a pilot arc initiation process of the torch, the physical contact configured to support transmission of a pilot arc current between the electrode and the nozzle with a density of at least about 3000 amps per square inch.

2. The liquid cooled electrode of claim 1, wherein the current transmission density is about 5000 amps per square inch.

3. The liquid cooled electrode of claim 1, wherein each contact surface has a surface area greater than about 0.002 square inches.

4. The liquid cooled electrode of claim 1, wherein a combined area of the one or more contact surfaces is greater than about 0.015 square inches.

5. The liquid cooled electrode of claim 1, wherein the contact surfaces are disposed radially around a circumference of the external surface of the electrode.

6. The liquid cooled electrode of claim 5, wherein the one or more contact surfaces are radially discontinuous and form discontinuous circumferential contacts between the electrode and the nozzle during the portion of the pilot arc initiation process.

7. The liquid cooled electrode of claim 6, further comprising one or more channels disposed on the exterior surface of the electrode, the one or more channels interspersed radially between the one or more contact surfaces to permit a pre-flow of plenum gas between the nozzle and the electrode during the portion of the pilot arc initiation process.

8. The liquid cooled electrode of claim 7, wherein each channel is positioned radially between a pair of the contact surfaces.

9. The liquid cooled electrode of claim 7, wherein each channel is substantially arcuate relative to the one or more contact surfaces.

10. The liquid cooled electrode of claim 7, wherein each channel has a cross-sectional width of greater than about 0.05 inches.

11. The liquid cooled electrode of claim 7, wherein the one or more contact surfaces and the one or more channels are uniformly spaced about the circumference of the external surface of the electrode to facilitate substantially symmetrical plasma arc initiation and transition through a bore of the nozzle.

12. The liquid cooled electrode of claim 7, wherein the one or more contact surfaces and the one or more channels are asymmetrically distributed around the circumference of the external surface of the electrode to influence a direction of plasma arc initiation and transition through a bore of the nozzle.

13. The liquid cooled electrode of claim 5, wherein the one or more contact surfaces are radially contiguous to each other around the distal end to form a continuous circumferential contact between the electrode and the nozzle during the portion of the pilot arc initiation process.

14. The liquid cooled electrode of claim 1, wherein each contact surface is configured to physically contact the nozzle over at least one of an axial distance of at least 0.02 inches.

15. The liquid cooled electrode of claim 1, wherein each contact surface is angled to be substantially parallel to a complementary interior surface of the nozzle.

16. The liquid cooled electrode of claim 1, wherein the distal end of the electrode body comprises a frustoconical section that tapers toward the emissive insert.

17. The liquid cooled electrode of claim 16, wherein the one or more contact surfaces are disposed on a plurality of pads raised above a surface of the frustoconical section, the plurality of pads shaped to seat against an internal surface of the nozzle during the portion of the pilot arc initiation process.

18. The liquid cooled electrode of claim 16, wherein the one or more contact surfaces are located at least 0.07 inches distally aft the emissive insert in the frustoconical section.

19. The liquid cooled electrode of claim 1, wherein the electrode body is substantially hollow for conducting a liquid coolant therein.

20. A liquid cooled nozzle for a contact start plasma arc cutting torch, the liquid cooled nozzle comprising:
a body defining a longitudinal axis, the body including a proximal end shaped to matingly engage a torch body of the contact start plasma arc cutting torch and a distal end located substantially opposite of the proximal end along the longitudinal axis, the distal end defining a plasma exit orifice; and
one or more contact surfaces disposed on an interior surface of the distal end of the nozzle body, the one or more contact surfaces extending over an interior conical surface of the nozzle and shaped to physically contact an electrode of the contact start plasma arc cutting torch during a portion of a pilot arc initiation process of the torch, wherein a combined area of the one or more contact surfaces is at least 0.015 square inches.

21. The liquid cooled nozzle of claim 20, wherein the physical contact is configured to support transmission of a pilot arc current between the electrode and the nozzle with a density of at least about 3000 amps per square inch.

22. The liquid cooled nozzle of claim 20, wherein the one or more contact surfaces are disposed radially around a circumference of the internal surface of the nozzle.

23. The liquid cooled nozzle of claim 22, wherein the one or more contact surfaces are radially discontinuous and form discontinuous circumferential contacts between the electrode and the nozzle during the portion of the pilot arc initiation process.

24. The liquid cooled nozzle of claim 23, further comprising one or more channels disposed on the internal surface of the nozzle, the one or more channels interspersed radially among the one or more contact surfaces to permit a pre-flow of plenum gas between the nozzle and the electrode during the portion of the pilot arc initiation process.

25. The liquid cooled nozzle of claim 22, wherein the one or more contact surfaces are radially contiguous to each other around the distal end and form a continuous circumferential contact between the electrode and the nozzle during the portion of the pilot arc initiation process.

26. The liquid cooled nozzle of claim 20, wherein the one or more contact surfaces are disposed on a plurality of pads raised relative to the inner surface of a frustoconical section of the nozzle, the plurality of pads shaped to seat against a complementary external surface of the electrode during the portion of the pilot arc initiation process.

27. The liquid cooled nozzle of claim 20, wherein each contact surface is angled to be substantially parallel to a complementary exterior surface of the electrode.

* * * * *